(12) United States Patent
Minot (10) Patent No.: US 8,386,660 B2
(45) Date of Patent: Feb. 26, 2013

(54) METHOD FOR GENERATING INTERFACE CONFIGURATION FILES FOR COMPUTERS OF AN AVIONIC PLATFORM

(75) Inventor: Frédéric Minot, Venerque (FR)

(73) Assignee: Airbus Operations SAS, Paris (FR)

( * ) Notice: Subject to any disclaimer, the term of this patent is extended or adjusted under 35 U.S.C. 154(b) by 9 days.

(21) Appl. No.: 12/882,691

(22) Filed: Sep. 15, 2010

(65) Prior Publication Data

US 2011/0066763 A1 Mar. 17, 2011

(30) Foreign Application Priority Data

Sep. 16, 2009 (FR) ...................................... 09 56355

(51) Int. Cl.
*G06F 3/00* (2006.01)
*G06F 15/177* (2006.01)
(52) U.S. Cl. ........................ 710/12; 710/8; 713/1; 713/2
(58) Field of Classification Search ........................ None
See application file for complete search history.

(56) References Cited

U.S. PATENT DOCUMENTS

| | | | | |
|---|---|---|---|---|
| 4,092,716 A * | 5/1978 | Berg et al. | .......................... | 701/3 |
| 4,965,879 A * | 10/1990 | Fischer, Jr. | ........................ | 701/3 |
| 5,428,543 A * | 6/1995 | Gold et al. | .......................... | 701/5 |
| 5,446,666 A * | 8/1995 | Bauer | ................................ | 701/4 |
| 5,493,497 A * | 2/1996 | Buus | ................................. | 701/4 |
| 5,636,210 A * | 6/1997 | Agrawal | ........................ | 370/390 |
| 5,654,906 A * | 8/1997 | Youngquist | .................... | 702/94 |
| 5,808,661 A * | 9/1998 | Infiesto et al. | ............. | 348/14.01 |
| 6,150,959 A * | 11/2000 | Germanetti | ................... | 340/971 |
| 6,219,032 B1 * | 4/2001 | Rosenberg et al. | ........... | 345/157 |
| 7,685,083 B2 * | 3/2010 | Fairweather | .................... | 706/45 |
| 7,940,195 B2 * | 5/2011 | Fabas et al. | .................... | 340/945 |
| 2005/0259724 A1 * | 11/2005 | Bergstrom et al. | ........... | 375/150 |
| 2007/0050100 A1 * | 3/2007 | Gustafson et al. | ................ | 701/3 |
| 2007/0271008 A1 * | 11/2007 | Ciholas et al. | .................... | 701/3 |
| 2010/0179710 A1 * | 7/2010 | Joseph | ............................. | 701/3 |

OTHER PUBLICATIONS

European Search Report issued on Oct. 12, 2010 in EP 10 17 4126.
Richard L. Alena, et al., "Communications for Integrated Modular Avionics", Aerospace Conference, 2007 IEEE, IEEE, Piscataway, NJ, USA, XP031214239, Mar. 3, 2007, pp. 1-18.
P. Bieber, et al., "Constraint-based Design of Avionics Platform-Preliminary Design Exploration", Internet Citation, URL:http://www.cert.fr/francais/deri/bieber/papers/ERTS2008_Bieber_0063.pdf [extrait le Apr. 14, 2010], XP007912632, Jan. 31, 2008, 7 pages.
"AFDX Protocol Tutorial (Version 3.0)", Condor Engineering, Internet Citation, URL:www.acalmicrosystems.co.uk/whitepapers/sbs8.pdf [extrait le Apr. 15, 2010], XP007912659, May 1, 2005, 55 pages.

(Continued)

*Primary Examiner* — Henry Tsai
*Assistant Examiner* — Michael Sun
(74) *Attorney, Agent, or Firm* — Oblon, Spivak, McClelland, Maier & Neustadt, L.L.P.

(57) ABSTRACT

The invention relates to a method for configuring interfaces of computers belonging to an avionic platform. The platform implements a plurality of avionic functions which may exchange functional messages, each functional message comprising one or more parameters. Each avionic function is implemented by means of software modules hosted by computers. For each software module hosted by a computer, signal occurrences are generated for transmitting all the parameters of the functional messages of the function associated with the software module, this on the different communications media. Next all the occurrences are grouped per functional system, parameter and communications medium in order to configure the interfaces of these computers.

11 Claims, 9 Drawing Sheets

OTHER PUBLICATIONS

"ARINC 429 Protocol Tutorial (Version 1.07)", Condor Engineering, Internet Citation, URL:www.acalmicrosystems.co.uk/whitepapers/sbs7.pdf [extrait le Apr. 15, 2010], XP007912660, Jul. 7, 2004, 29 pages.

* cited by examiner

METHOD FOR GENERATING INTERFACE CONFIGURATION FILES FOR COMPUTERS OF AN AVIONIC PLATFORM

TECHNICAL FIELD

The present invention generally relates to the field of avionic platforms, notably but not exclusively, to those which are made according to an integrated modular architecture, so-called IMA (Integrated Modular Avionics).

STATE OF THE PRIOR ART

The making of an avionic platform, i.e. of the whole of the on-board computing and communications means allowing execution of the functions of an aircraft, traditionally resorts to computers and dedicated communications buses. In such a platform, each function of the aircraft, designated hereafter as avionic function is implemented with computers having an architecture and inputs/outputs specific to fulfilling the function. This involves the making, certification and maintenance of a large number of components or LRUs (Line Replaceable Units), and this practically at each time that a new type of apparatus has to be designed.

In order to find a remedy to this source of complexity and costs, new generation avionic platforms, if possible, use an integrated modular (IMA). In this type of architecture, the avionic functions are implemented in shared resources, in practice as software modules hosted by generic computers, and using non-dedicated communications means. Such a platform has many advantages in terms of reduction in the amount of computers, in the number of different types of computers, in the number of cables, etc., which is finally expressed by a more favorable mass balance and significant gains as regards maintenance and management of inventories.

Whichever the type of platform, the different avionic functions exchange messages, so-called functional messages. For example the avionic function responsible for calculating the position of the aircraft is capable of transmitting a position message to the one responsible for flight management. As these avionic functions are implemented by dedicated or generic computers, these exchanges at a functional level are in practice expressed by data exchanges by means of interfaces located in the different computers. By interface is meant here the whole of the physical and logic means allowing a computer to receive and/or transmit data. These interfaces are configured by software during an initialization step with interface configuration files, lying in the various computers and designated more simply hereafter by interface files.

Generation of interface files and, more generally, configuration of the interfaces, are traditionally carried out manually by data entry operators with non-negligible risks of errors, errors which may have important repercussions during the integration and validation phases of the aircraft.

The integration of the systems of an aircraft is achieved incrementally, function by function or, more generally, function set by function set. At each integration step, the computers required for implementing the functions to be integrated then have to be determined and the interfaces of these computers have to be configured so that the exchanges between computers actually support the exchanges between said functions.

Further, it must be ensured that each interface is capable of supporting the whole of the functional exchanges in which it intervenes. If functional modifications are introduced belatedly, this validation phase may give rise to back and forth bounces with the design phase and subsequently to significant delays, since each impacted interface has to be reconfigured manually.

Finally, at each design of a new aircraft or even of a new version of the same aircraft, this configuration work of the interfaces has to be entirely repeated, in any case the functional architecture would remain identical. The problem is similarly posed if the aircraft is subject to upgrading (retrofit).

An object of the present invention is therefore to propose a computer-aided method for configuring interfaces of an avionic platform, from a functional description of this platform.

DISCUSSION OF THE INVENTION

The present invention is defined by a method for configuring interfaces of computers belonging to an avionic platform, said platform implementing a plurality of avionic functions which may exchange functional messages, each avionic function being implemented by software modules, so-called functional system occurrences, hosted in computers, said computers being able to communicate with signal occurrences transmitted over communications media which connect them together. For each software module hosted by a computer, signal occurrences are generated for transmitting all the parameters of the functional messages emitted by the function implemented by the software module, this over all the communications media, and said signal occurrences are grouped by functional system, parameter and transmission medium for generating signal occurrence classes, and the interfaces of the computers are configured with the thereby obtained classes.

Advantageously, a communications port of a computer is assigned to each class, designated by signal.

For each software module fs_oc hosted by a computer, it is possible to determine the list f_l of the avionic functions in the implementation of which this software module intervenes, and then the list p_l of the parameters comprised in functional messages emitted by the functions of f_l and, for each parameter p of p_l, a list fl_l of links between avionic functions, so-called functional links, conveying at least one functional message containing said parameter p. A list path_l of paths through the communications media allowing the forwarding of said messages is inferred therefrom, a path may consist of a direct link between a first computer and a second computer, or else of a first link between the first computer and a first node of a network, of a path through this network and of a second link between a second node of the network and the second computer, and finally the list med_l of communications media first followed by the paths of path_l is determined.

Advantageously, for a given software module fs_oc, a signal occurrence is generated for each parameter p of p_l, each communications media med of med_l and a subset signal_oc_ path_l of paths of path_l such that the first link of these paths passes through a communications media med of med_l.

According to an alternative, the avionic platform comprises at least one computer connected to two communications media of distinct types, said computer hosting a software module suitable for operating as an applicative gateway between both communications media.

For a given signal occurrence, signal_oc, associated with a software module fs_oc, a parameter p, and with a subset signal_oc_path_l, a subset signal_oc_gtw_l of the latter consisting of the paths passing through at least one computer hosting a so-called application gateway, and then the set gtw_l of the application gateways hosted by computers placed on the paths of signal_oc_gtw_, may be determined. Are then determined for each gateway gtw of gnv_l:

the list ghv_rx_med_l of the communications media arriving at gtw via a path of signal_oc_gtw_path_l;

the list gtw_tx_med_l of the communications media leaving gtw via a path of signal_oc_gtw_path_l;

the subset gtw_path_l of signal_oc_gtw_path_l formed by the paths passing through a computer hosting the gateway gtw.

For each gateway gtw de gtw_l and each communications medium of gtw_tx_med_l, a signal occurrence gtw_signal_oc associated with the gateway gtw, with the parameter p, with the communications medium med and with the set of paths gtw_path_l is advantageously created.

For each signal occurrence signal_oc, associated with a source software module fs_oc or an application gateway gtw, a parameter p, a communications medium med and with a set of paths signal_oc_path_l or gtw_path_l, for each path path of signal_oc_path_l or gtw_path_l, the first computer placed on the path path after the one which hosts the software module ft_oc or the application gateway gtw is then determined and if this computer hosts a gateway, the signal occurrence signal_oc is associated with the latter, and if not, it is associated with the addressed software module of the functional link occurrence associated with the path pad.

Advantageously, a communications port of the computer hosting the application gateway and the addressed software module is assigned to the signal occurrence signal_oc.

According to a particular embodiment, the relevant avionic platform above is of the IMA type.

SHORT DESCRIPTION OF THE DRAWINGS

Other features and advantages of the invention will become apparent upon reading preferential embodiments of the invention with reference to the appended figures wherein.

DETAILED DISCUSSION OF PARTICULAR EMBODIMENTS

The method for generating interface files according to the invention advantageously resorts to a functional description of the avionic platform which we shall present as an illustration within the scope of an IMA architecture.

This platform is intended to apply a set of predetermined avionic functions. As an example, these avionic functions may be the calculation of the position of the aircraft, the management of the flight plan, the control of the roll of the aircraft, the calculation of the amount of fuel, etc.

With each of these avionic functions, is generally associated a plurality of software modules intended to be hosted in on-board generic computers and each of which participates in fulfilling the function. For safety reasons, certain functions may be duplicated. The thereby duplicated function software modules are not necessarily identical. For example, two such software modules may correspond to a control route (COM) and to a monitoring route (MON) of a flight control system and use different algorithms for fulfilling the same function.

The software modules associated with the different avionic functions may exchange messages between each other via links, designated as « functional link occurrences ». For example, a software module fulfilling the roll control function may transmit an alert message to a software module responsible for the display function. Also, a software module responsible for calculating the latitude and the longitude of the aircraft may transmit this position information to a software module responsible for calculating the flight plan.

The set of avionic functions of an aircraft as well as their relationships among each other may advantageously be illustrated by means of object modeling.

Figure 1:
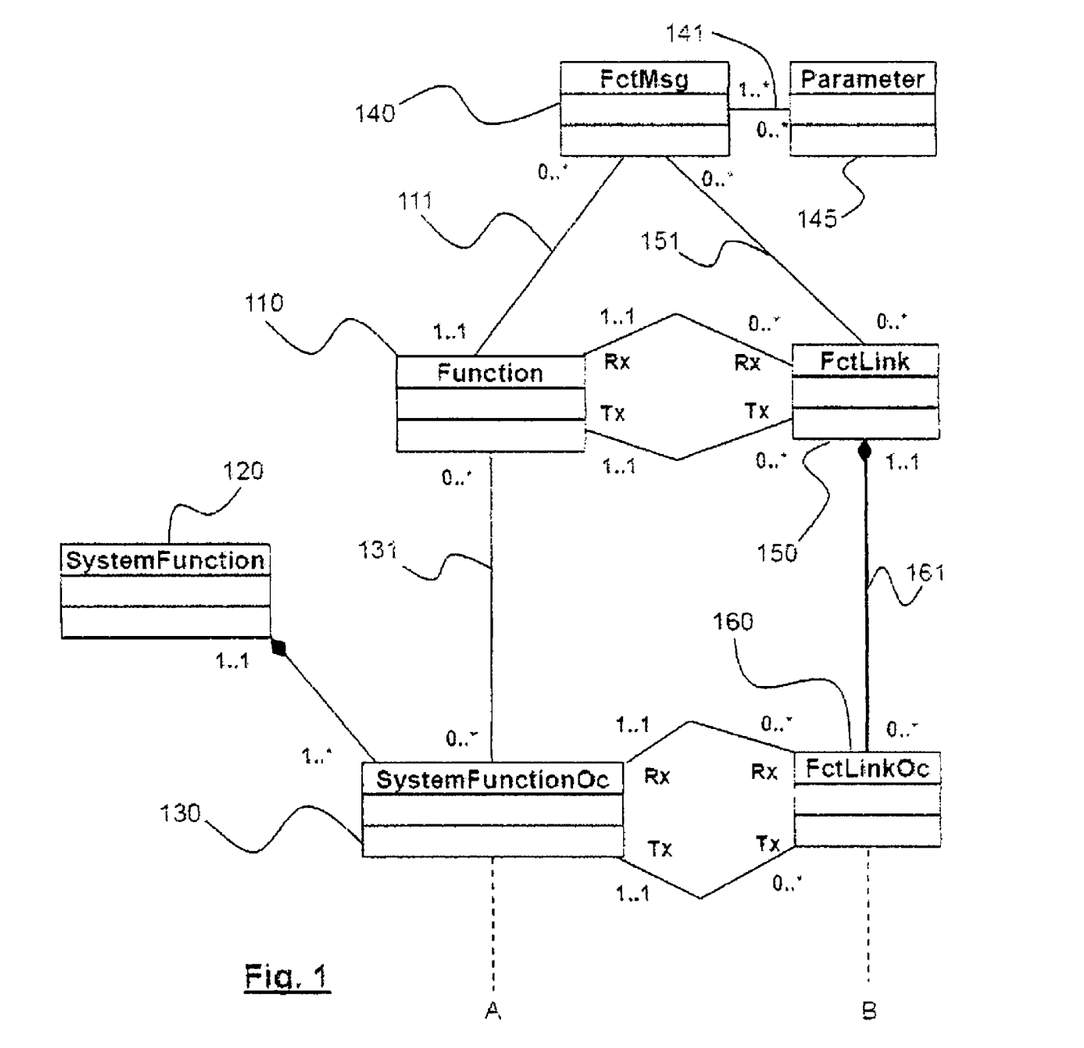
FIG. 1 gives an object-oriented schematic illustration of the functional architecture of an aircraft.

FIG. 1 gives a UML (Unified Modeling Language) diagram modeling the structure of data and the relationships between avionic functions of an aircraft. For example, a description of the UML language will be found in the textbook of F. Barbier entitled <<UML2 et MDE>> published by Dunod.

The illustrated model comprises objects (or classes) designated as « Function », « SystemFunction », « SystemFunctionOc », « FctMsg », « FctLink » and « FctLinkOc ». For reasons of simplification, the attributes and the methods relating to the different objects have been omitted there where they do not seem to be necessary for properly understanding the invention.

The object « Function », 110, corresponds to an avionic function. This object is associated with any multiplicity to « SystemFunctionOc » objects, 130, explained hereafter. A function may transmit any number of messages, by means of a symbolic link called a functional link, to another function. Thus, the object « Function », 110, is associated with 0 to N « Fctmsg » objects, 140, describing the relevant messages. Each functional link, modeled by the object « FctLink », 150, is associated with a transmitting avionic function and an addressed avionic function. Conversely, with a function may be associated any number of ingoing functional links as well as any number of outgoing functional links. Further, a functional link may have any number of messages passing in transit through it and vice versa, a message of an avionic function may be transmitted on any number of functional links. A message may consist of a set of elementary data designated hereafter as parameters, illustrated by the object 145. For example, a message relating to the position of the aircraft may comprise the longitude and latitude parameters. A parameter may be associated with a single message or be common to several messages.

Each functional link 150, is instantiable and consisting of 0 to N functional link occurrences, 160. Functional link occurrences are designated by the object « FctLinkOc ».

The object « SystemFunction » or functional system, designated by 120, is associated with at least one « SystemFunctionOc » occurrence, 130. The object 130 may in practice be considered as a software module intended to be hosted by a piece of equipment, the object 120 then illustrating a class of such software modules. The object 130 is associated with any number of ingoing functional link occurrences, as well as with any number of outgoing functional link occurrences.

Vice versa, a functional link occurrence is associated with a transmitter software module and an addressed software module.

The model of FIG. 1 allows the storage of a functional representation of the avionic platform in a database, a so-called functional database.

Figure 2:
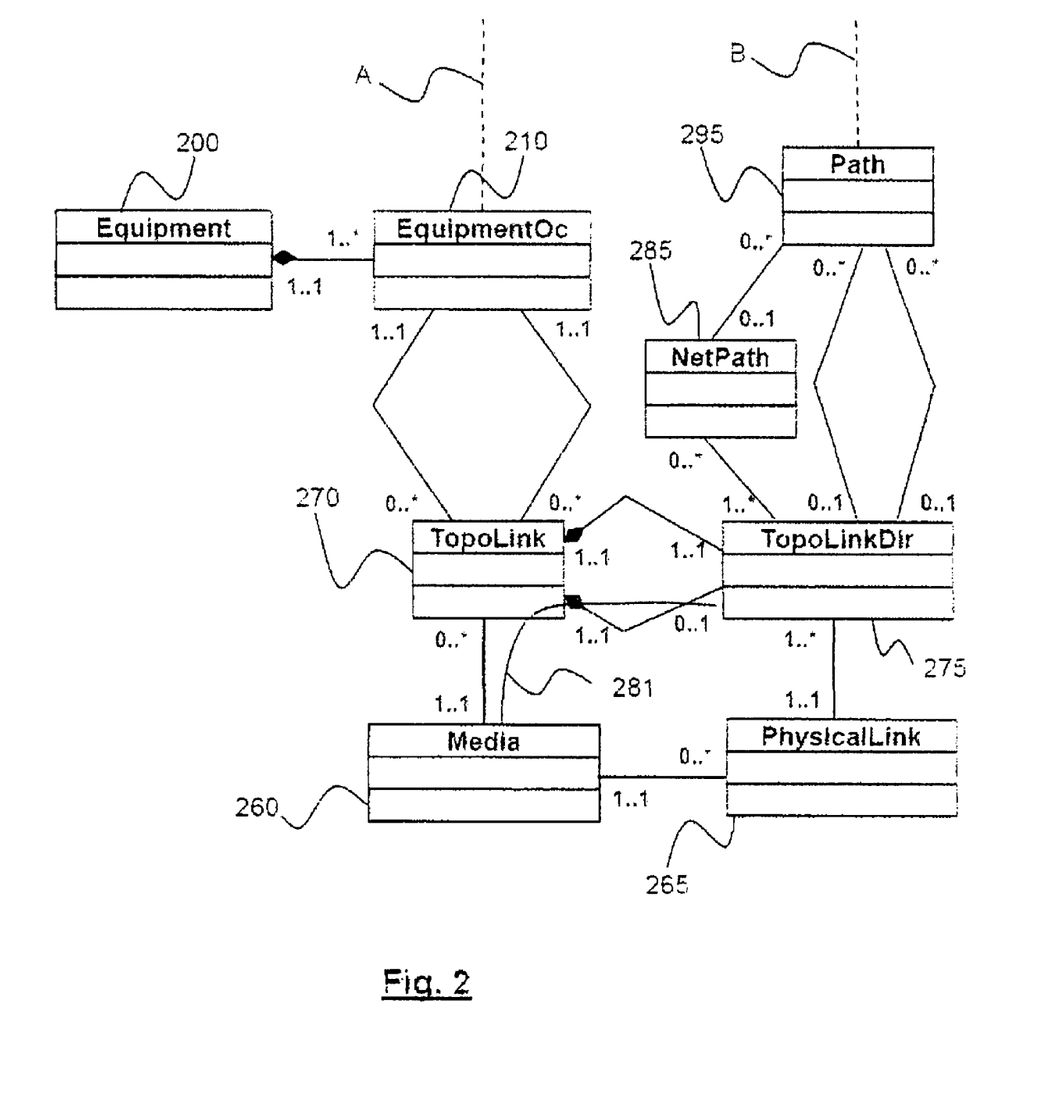
FIG. 2 gives an object-oriented schematic illustration of the material architecture of an avionic platform.

An object representation (in UML) of the material structure of the avionic platform is given in FIG. 2.

The material structure is described by means of objects designated as «Equipment», «EquipmentOc», «TopoLink», «TopoLinkDir», «NetPath», «Path», «Physical Link» and «Media» defined hereafter.

The basic brick of this material structure is the object «Equipment», 200, itself made up by one or more equipment occurrences, 210. Practically, the object «Equipment» illustrates a class consisting of material elements such as computers, sensors, actuators, switches, routers, gateways, etc. A piece of equipment may more generally be considered as a material element having computing and/or communication resources. Each equipment occurrence, 210, inherits attributes of the object «Equipment» and notably of its material resources.

The object «PhysicalLink», 265, represents physical connections, independently of the network to which they may belong. With a physical link it is possible to connect an equipment occurrence to one or more other equipment occurrences. Each physical connection may consist of one or more physical connection branches, a physical connection branch connecting an equipment occurrence to a single other equipment occurrence.

The object «TopoLink» or topological link, 270, is an abstract entity indicating the possibility of connecting two equipment occurrences by means of a physical connection, unidirectionally or bidirectionally. From this object, an oriented topological link is defined, i.e. «TopoLinkDir», 275, each topological link either consisting of one or two oriented topological links. The object «TopoLinkDir» may be considered equivalently as a physical connection branch. The object «Media» gives the type of communications medium used by a physical connection branch. For example, this communications medium may be an AFDX network, an ARINC 429 network, a CAN bus.

The net path object «NetPath», 285, is further defined as an ordered and closely related list of oriented topological links between communications network nodes. It is important to emphasize that the underlying physical connections to these oriented topological links do not necessarily belong to a same network. A network path comprises at least one topological link and, conversely, an oriented topological link may be part of any number of network paths, or even of no network path if this link is isolated.

Finally, a more general object, a so-called «Path» or topological path, 295, is defined which may connect two arbitrary equipment occurrences of the avionic platform. Such a path either consists of an oriented topological link in either direction (in other words, the equipment occurrences are connected through a simple physical connection), or of a network path to which is added an oriented topological link at one or at both of its ends.

The model of FIG. 2 allows a representation of the material architecture of the avionic platform to be stored in a database, a so-called material database.

Figure 3A:
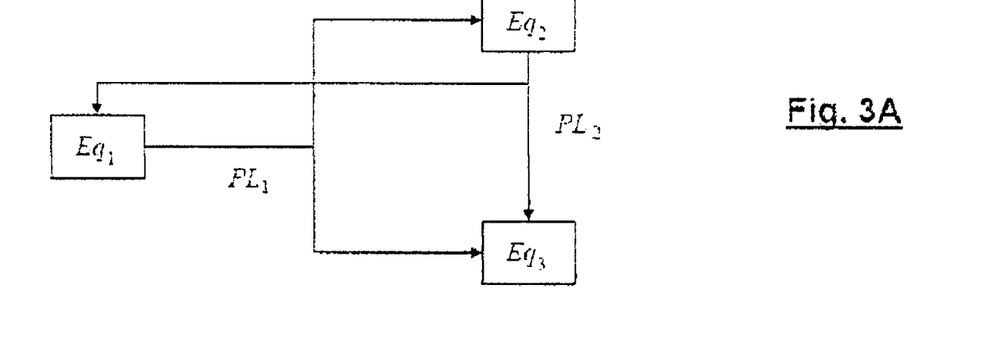
FIGS. 3A-3C illustrate examples of physical connections, topological links, network paths, and topological paths in an avionic platform.
Figure 3B:
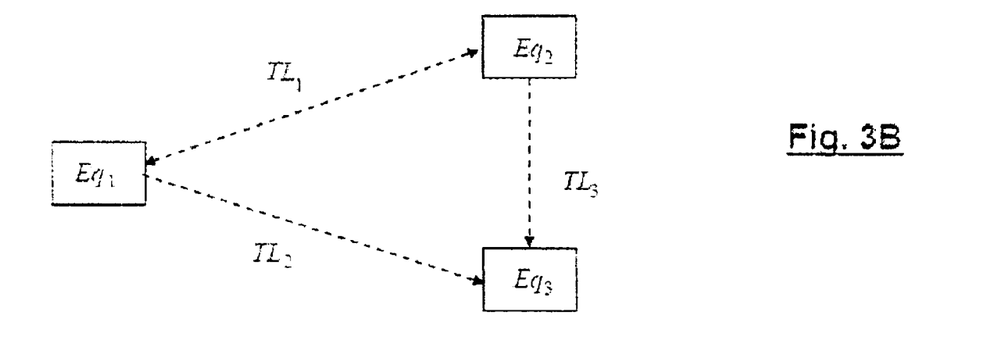
Figure 3C:
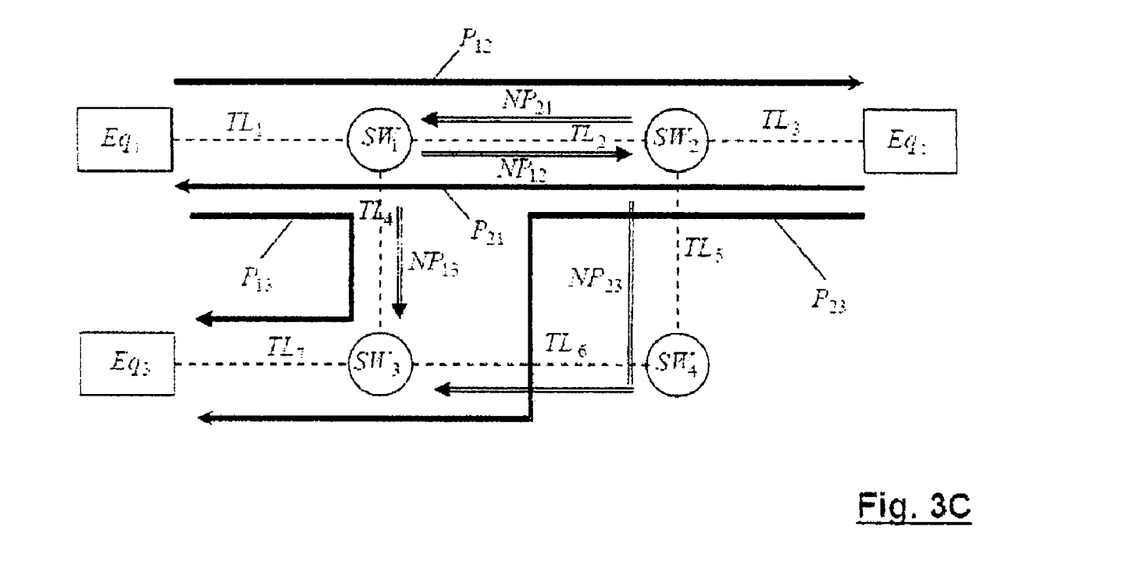

As an illustration, we have given examples of physical connections, of topological links, of network paths and of topological paths between various pieces of equipment in FIGS. 3A-3C.

In these figures, three pieces of equipment (more strictly, according to object terminology, three equipment occurrences) $Eq_1, Eq_2, Eq_3$ are illustrated.

In FIG. 3A, the piece of equipment $Eq_1$ is connected to the pieces of equipment $Eq_2, Eq_3$ by means of a first physical connection $PL_1$ (of the type $1 \Rightarrow N$). Also, the piece of equipment $Eq_2$ is connected to the pieces of equipment $Eq_1, Eq_3$, by means of a second physical connection $PL_2$ also of the type $(1 \Rightarrow N)$.

FIG. 3B illustrates the topological links $TL_1$, $TL_2$, $TL_3$ associated with the physical connections of FIG. 4A. More specifically, the topological link $TL_1$ between the pieces of equipment $Eq_1$ and $Eq_2$ is associated with the physical connections $PL_1$ and $PL_2$ between both of the pieces of equipment. The topological link $TL_1$ in fact consists of a first oriented topological link between $Eq_1$ and $Eq_2$ and of a second oriented topological link, in the reverse direction. The topological links $TL_2$ and $TL_3$ are respectively associated with the physical connections $PL_1$ and $PL_2$. They each consist of a single oriented topological link.

FIG. 3C illustrates three pieces of equipment $Eq_1, Eq_2, Eq_3$ connected by means of an AFDX network comprising four switches $SW_1, \ldots, SW_4$. The different bidirectional topological links (of the type $1 \Leftrightarrow 1$), are designated by $TL_1$ to $TL_7$, each topological link 11, consisting of two oriented topological links $TL_i^+$ and $TL_i^-$ (the positive direction was conventionally selected here as the clockwise direction). The network paths $NP_{12}$, $NP_{21}$, $NP_{13}$, $NP_{23}$, are also indicated, respectively defined by $NP_{12}=\{TL_2^+\}$; $NP_{21}=\{TL_2^-\}$; $NP_{13}=\{TL_4^+\}$; $NP_{23}=\{TL_5^+,TL_6^+\}$. The topological path $P_{12}$ which connects the piece of equipment $Eq_1$ to the piece of equipment $Eq_2$ is then formed by $P_{12}=\{TL_1^+,NP_{12},TL_3^+\}$. Similarly, the topological path $P_{21}$ which connects the piece of equipment $Eq_2$ to the piece of equipment $Eq_1$ is formed by $P_{21}=\{TL_3^-,NP_{21},TL_1^-\}$. The topological path $P_{13}$, connecting the piece of equipment $Eq_1$ to $Eq_3$, and the one $P_{23}$ connecting the piece of equipment $Eq_2$ to $Eq_3$ are respectively formed by $P_{13}=\{TL_1^+,NP_{13},TL_7^+\}$ and $P_{23}=\{TL_3^-,NP_{23},TL_7^+\}$.

Figure 4:
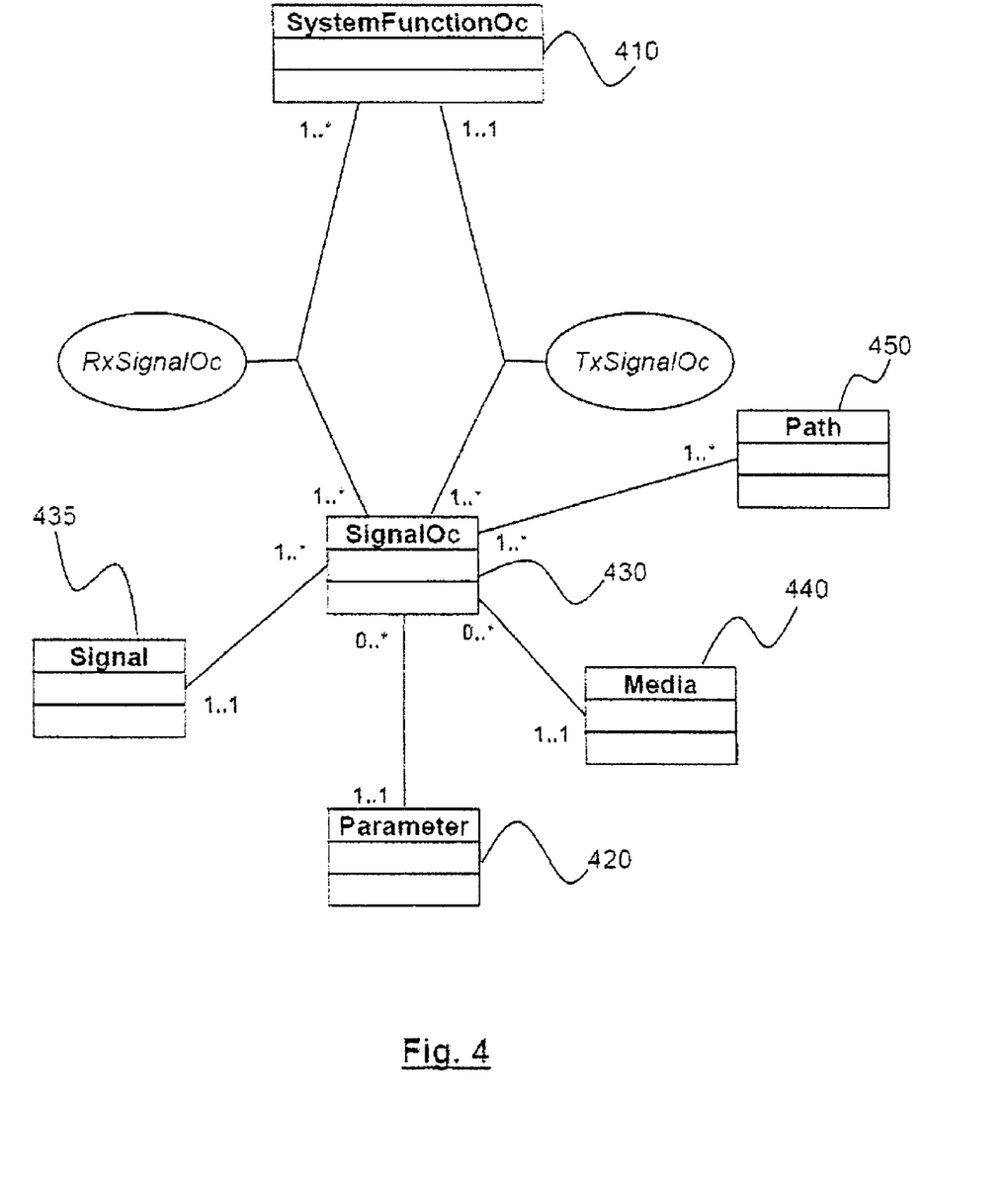
FIG. 4 gives an object-oriented schematic illustration of the exchanges between interfaces of an avionic platform.

FIG. 4 gives an object representation (UML) of data exchanges between software modules hosted by pieces of equipment of the avionic platform.

The objects «SystemFunctionOc» and «Parameter» of the functional representation as well as the object «Path» of the material representation are also found in this figure.

The software modules (represented by «SystemFunctionOc», 410) exchange parameters with each other (represented by «Parameter», 420) by means of signal occurrences (represented by «SignalOc», 430). These signal occurrences are instances of an object «Signal», designated by 435). As this will be seen in detail later on, the object «Signal» represents a class of signal occurrences associated with a same parameter, a same source software module and a same communications medium. The different communications media are represented by the object «Media», 440. The signal occurrences relative to a same signal may follow distinct topological paths. The topological paths are modeled by the object «Path», 450.

With the data model of FIG. 4, it is possible to represent the exchanges between software modules by means of signal occurrences, a signal expressing an exchange between functional systems.

A signal occurrence is associated with a source software module and with one or more addressed software modules. Vice versa, with a given software module, it is possible to associate a set of ingoing signal occurrences (RxSignalOc) and a set of outgoing signal occurrences (TxSignalOc). The set of ingoing signal occurrences and of outgoing signal occurrences relative to the software modules hosted by this computer may thereby be defined for an on-board computer. The attributes of the ingoing signal occurrences are gathered in a file, a so-called input interface file of the computer. Similarly, the attributes of the outgoing signal occurrences are gathered in an output interface file of the computer. The input and output interface files may be grouped in a single file, called simply an interface file. This interface file allows configuration of the input and output interfaces during the initialization of the computer.

An object modeling an input interface file will respectively be noted as «InputInterface» and an object modeling an output interface file will be noted as «OutputInterface».

Figure 5A:
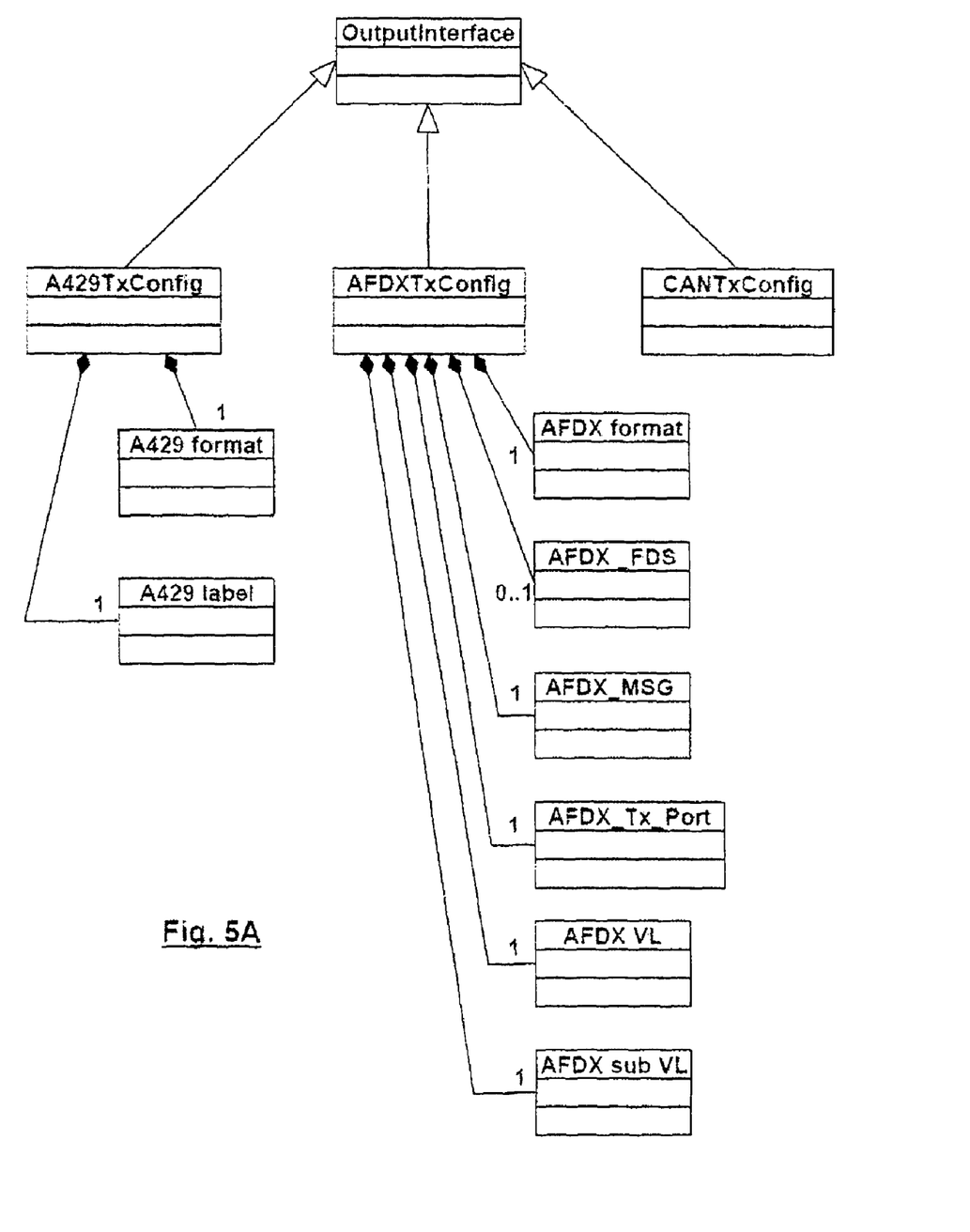
FIGS. 5A and 5B give an object-oriented illustration of the respective output and input interfaces of a computer of the avionic platform.

The output interface file is structured depending on different types of communications media. In the illustrated case, the output interface of the computer is connected to an AFDX network, to an ARINC 429 data bus and to a CAN bus. A detailed description of the AFDX network will be found in the document entitled «AFDX protocol tutorial» available under: www.acalmicrosystems.co.uk/whitepapers/sbs8.pdf and of the ARINC 429 protocol in the document entitled «ARINC 429 protocol tutorial» available under the URL: www.acalmicrosystems.co.uk/whitepapers/sbs7.pdf.

The output interface file contains for each communications media the attributes of each output signal occurrence transmitted over this medium. For example, a signal occurrence transmitted over the ARINC 429 bus will be characterized by its format and its label. Similarly, a signal occurrence transmitted over the AFDX network will be characterized by a certain number of parameters, for example the virtual link (and optionally the virtual sublink) to which it is attached, the AFDX transmission port (AFDX_Tx_Port) i.e. the UDP port, over which information will be transmitted, the indications allowing localization of information transmitted in the UDP payload frame (AFDX message format, Functional Data Sets etc.).

Figure 5B:
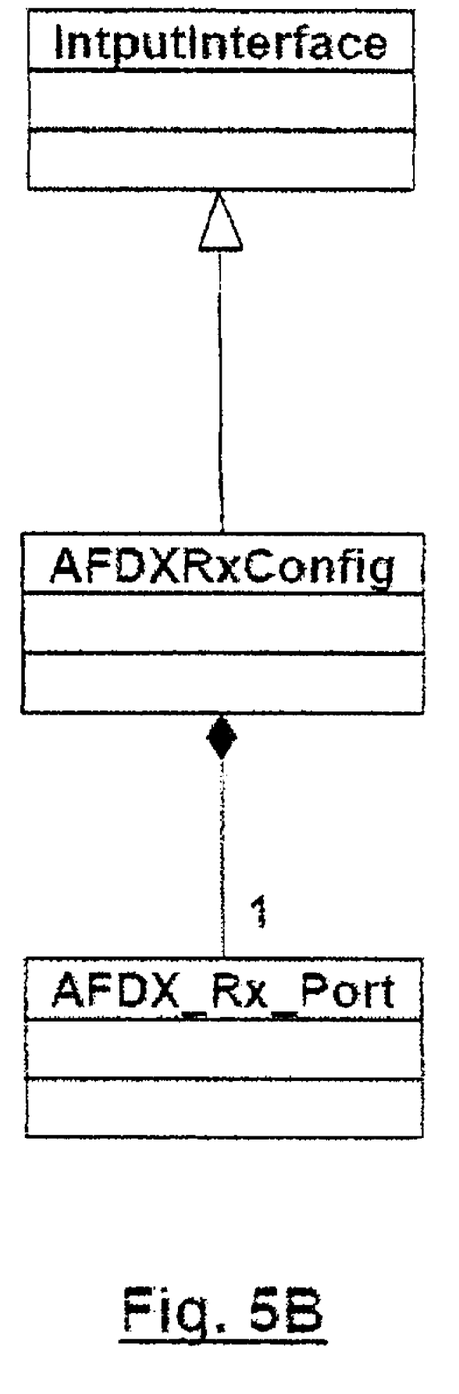

FIG. 5B illustrates in UML an example of a data structure of an input interface file of the class «InputInterface».

As a general rule, the input interface file is structured depending on the different types of communications media. In the illustrated case, the input interface of the computer is only connected to an AFDX network and the input interface file comprises for each input signal occurrence the AFDX receiving port (AFDX_Rx_Port), i.e. the UDP port on which the information relating to this signal may be recovered.

It should be noted that the communication ports (of the input or output interfaces) associated with different occurrences of a same signal are not necessarily identical.

Figure 6:
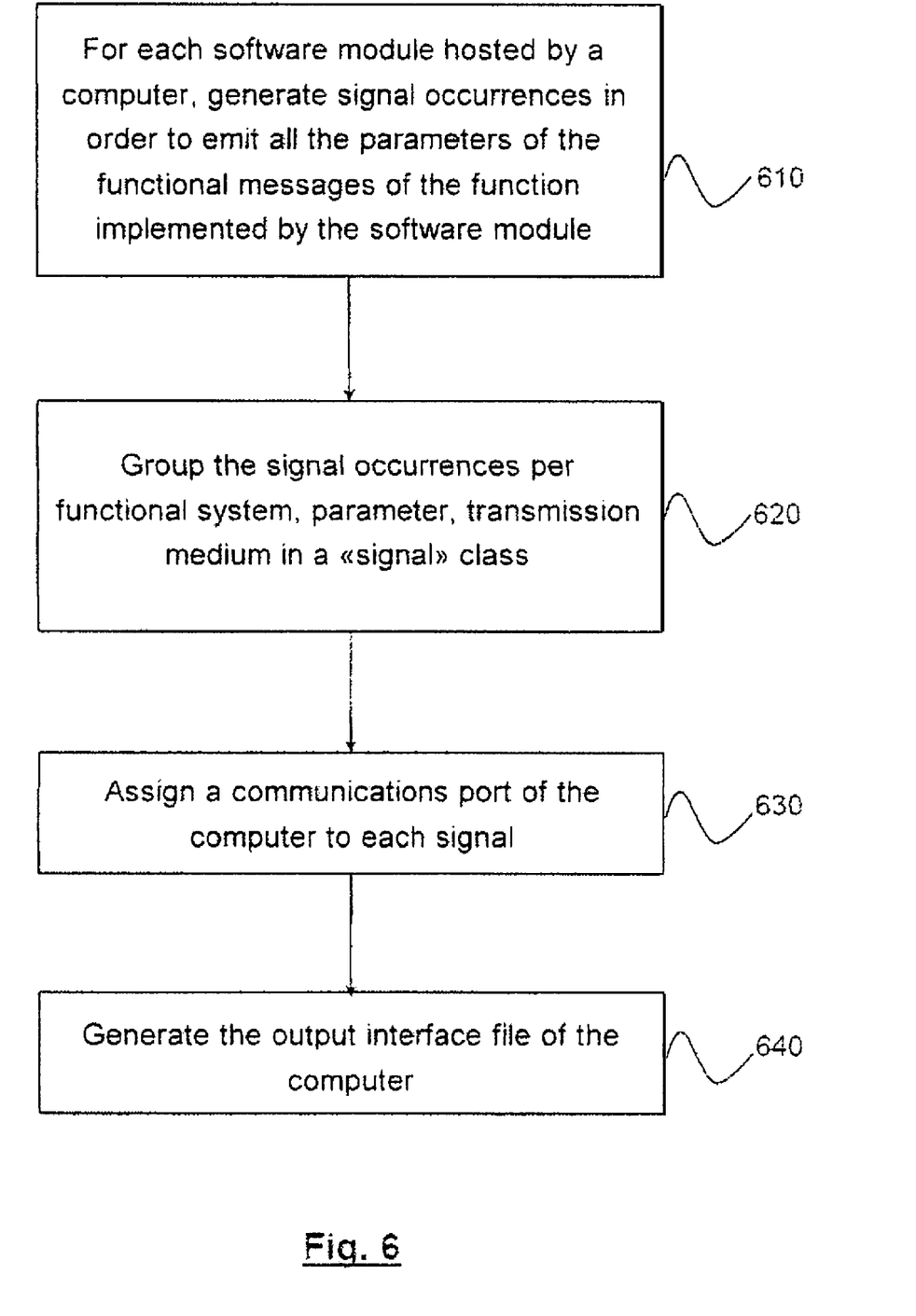
FIG. 6 illustrates the flowchart of a method for configuring an output interface of a computer according to an embodiment of the invention.

FIG. 6 schematically illustrates a method for configuring respective output interfaces of the computers of the avionic platform according to an embodiment of the invention.

In a first step 610, for each software module fs_oc, hosted by an on-board computer (equipment occurrence), the set of signal occurrences noted as signal_oc, emitted by this software module is generated.

More specifically, for a given software module fs_oc, the list f_l of the functions in which the software module fs_oc intervenes, see relationship 131 in FIG. 1 is recovered from the functional database. From this same database, the list p_l of the parameters provided by any function $f\_l$ is determined, i.e. the list of the parameters comprised in the messages emitted by the functions belonging to f_l, see successively the relationships 111 and 141 in FIG. 1.

For each parameter p∈p_l, the list fl-l of the functional links conveying at least one message containing the parameter p is then determined from the functional database (see successively relationships 141 and 151 in FIG. 1). For each functional link fl∈fl_l, the occurrences of this link (relationship 161) are then determined. Let fl_oc_l be the list of the occurrences of all the functional links of fl-l. The list path_l of the topological paths associated with the functional link occurrences of fl_oc_l (or even the relationship B connecting FIGS. 1 and 2) is inferred therefrom and then, from the material database, the list med_l of the communications media (relationship 281 in FIG. 2) used by the first oriented topological links of the topological paths of path_l is inferred. More specifically, if a topological path path of path_l is formed by a single oriented topological link between a source equipment occurrence and an addressed equipment occurrence, the first oriented topological link path_first_link of path will be this single link. If the topological path on the other hand consists of a topological link connecting the source equipment occurrence to a network element, a path through the network (Net-Path) and then another topological link of an element of this network to an addressed equipment occurrence, path_first_link will be the topological link connecting the source equipment occurrence to said network.

From the list of parameters p_l and from the list of communications media med_l determined earlier, signal occurrences are generated as follows: for each parameter p∈p_l and each communications medium med∈med_l, an object signal_oc is created defining a signal occurrence associated with fs_oc, p, med and with a subset signal_oc_path_l of path_l such that ∀path∈signal_oc_path_l, path_first_link is associated with med. In other words, with this signal occurrence is associated the set of topological paths from the software fs_oc and conveying the parameter p over the communications medium med. Advantageously, the same identifier as that of the software module signal_oc emitting the parameter p is assigned to the signal occurrence signal_oc.

In a second step 620, all the signal occurrences signal_oc relative to a same parameter, a same functional system and to a same communications medium med (the software modules are occurrences of a functional system) are grouped. A class of signal occurrences is thereby defined, i.e. an object «Signal» in the sense of FIG. 4.

In a third step, 630, an output (logic or physical) port is assigned to each thereby defined signal. By proceeding in this way, one makes sure of the consistency of the configuration of the (output) interfaces for all the software modules associated with a same functional system. On the other hand, in the case of a change in the hardware structure of a computer type (for example a modification of a physical port into a logic port), it is easy to assign a new output port to each signal.

In a fourth step, 640, the (output) interface file of each computer is generated from the attributes of the thereby defined signal.

Figure 7:
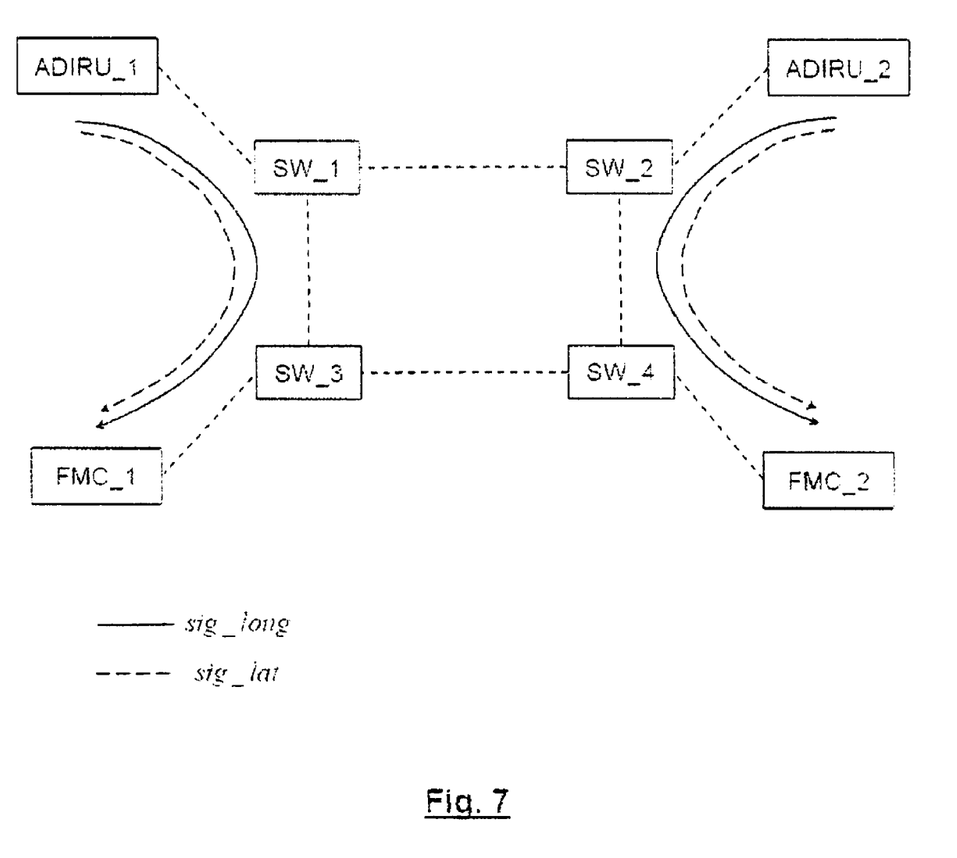
FIG. 7 gives a simplified example of an avionic platform providing an illustration of the method for configuring an interface according to the invention.

An exemplary application of the configuration method according to the invention is described hereafter in connection with FIG. 7, illustrating a very simplified case of avionic platform.

In this example two avionic functions are considered, one performing the calculation of the position of the aircraft, f_pos and the one carrying out management of the flight plan f_fpm, exchanging a functional message over a functional link. More specifically, the function $f\_pos$ transmits to the function $f\_fpm$ a functional message comprising the parameters lat and long indicating the latitude and the longitude of the aircraft respectively. The function $f\_pos$ involves the ADIRS (Air Data Inertial Reference System) functional system and the function $f\_fpm$ involves the FMS (Flight Management System) functional system. The ADIRS system is implemented with a first software module ADIRS_1 and a second software module ADIRS_2 (occurrences of the ADIRS functional system) hosted by the computers ADIRU_1 and ADIRU_2 respectively (occurrences of the ADIRU equipment). Similarly, the FMS system is implemented with a first software module FMS_1 and a second software module FMS_2 hosted by the computers FMC_1 and FMC_2 respectively.

The computers ADIRU_1, ADIRU_2, FMC_1 and FMC_2 are illustrated in FIG. 7, connected by means of an AFDX network comprising four frame switches SW_1, SW_2, SW_3 and SW_4. The AFDX network is therefore the only communications medium used here.

The first occurrence of the functional link connects ADIRS_1 to FMS_1 and the second occurrence of this link connects ADIRS_2 to FMS_2. The first occurrence of the functional link is implemented by a first topological path connecting ADIRU_1 to FMC_1. This path consists of topological links ADIRU_1⇒SW_1, SW_1⇒SW_3, SW_3⇒FMC_1. Also, the second occurrence of the functional link is implemented by means of the second topological path connecting ADIRU_2 to FMC_2. This path consists of topological links ADIRU_2⇒SW_2, SW_2⇒SW_4, SW_4⇒FMC_2.

The signal occurrence lat_1 associated with the software module ADIRS_1, with the parameter lat, with the communications medium AFDX and with the topological path ADIRU_1⇒SW_1⇒SW_3⇒FMC_1 may thereby be generated. Also, it is possible to generate the signal occurrence lat_2 associated with the software module ADIRS_2, with the parameter lat, with the communications medium AFDX and with the topological path ADIRU_2⇒SW_2⇒SW_4⇒FMC_2.

In a similar way, is generated the signal occurrence long_1 associated with the software module ADIRS_1, with the parameter long, with the communications medium AFDX and with the topological path ADIRU_1⇒SW_1⇒SW_3⇒FMC_1. Finally, it is possible to generate the signal occurrence long_2 associated with the software module ADIRS_2, with the parameter long, with the communications support AFDX and with the topological path ADIRU_2⇒SW_2⇒SW_4⇒FMC_2.

The signal occurrences lat_1 and lat_2 may be grouped in order to create a signal sig_lat. Also the signal occurrences long_1 and long_2 may be grouped in order to create a signal sig_long.

A communications port associated with the ADIRS functional system is then assigned to the signal sig_lat, which amounts to creating an UDP output port here in each of the computers ADIRU_1 and ADIRU_2. This communications port is not necessarily the same in each of the computers.

Similarly, a communications port associated with the ADRIS functional system is assigned to the signal sig_long. If necessary, the same communications port may be assigned to the signal sig_lat and sig_long.

As this was seen in connection with FIG. 5A other attributes may be filled in for the occurrences of sig_lat and of sig_long in the output interface file.

Certain software modules emit signal occurrences without being the cause of the parameters which they transmit. They play the role of a gateway (at an application level) between different communications media.

Figure 8:
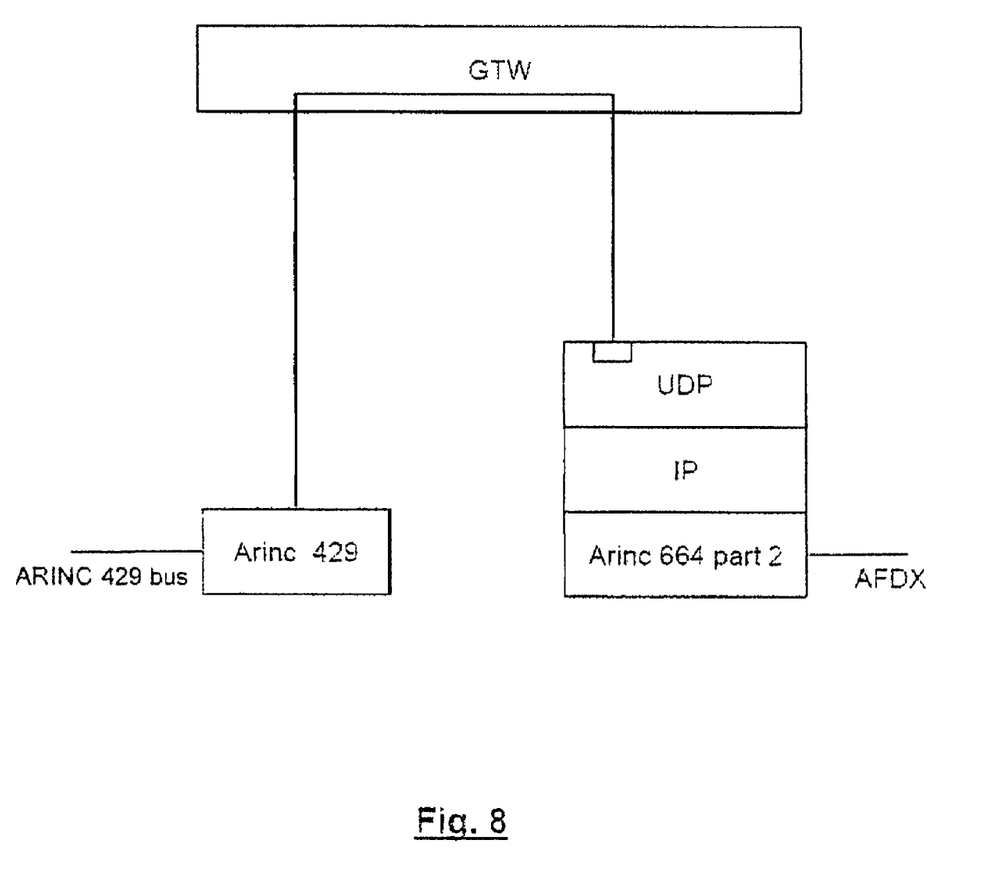
FIG. 8 schematically illustrates an exemplary application gateway.

We have illustrated in FIG. 8 an example of such a gateway between an AFDX network and an ARINC bus 429 by showing the protocol layers applied. The software module GTW playing the role of an application gateway is hosted by a computer connected to both of these communications media. The GTW gateway is connected on the one hand to an UDP port on which it receives an ingoing signal occurrence and to an ARINC 429 physical port on which it emits an outgoing signal occurrence.

The configuration of the output interfaces for the computers hosting application gateways differs from that described for the source software modules.

In order to configure these output interfaces, the list of signal occurrences generated by the whole of the source software modules is used, as explained in connection with FIG. 6.

For a given signal occurrence signal_oc, associated with a source software module fs_oc, a parameter p and a subset of paths signal_oc_path_l, the subset of signal_oc_path_l is defined consisting of the paths on which an equipment occurrence (a computer) hosting a gateway is placed. This subset is noted as signal_oc_gtw_path_l. Let gtw_l be the set of gateways hosted by computers placed on the paths of signal_oc_gtw_path_l.

For each gateway gtw∈gtw_l, it is possible to infer:
  the list gtw_rx_med_l of the communications media arriving at gtw via a path of signa_oc_gtw_path_l;
  the list gtw_tx_med_l of the communications media leaving gtw via a path of signal_oc_gtw_path_l;
  the subset gtw_path_l of signal_oc_gtw_path_l formed by the paths passing through a computer hosting the gateway gtw.

With these conventions, for each gateway gtw of gtw_l and each communications medium med of gtw_tx_med_l, an outgoing signal occurrence gtw_signal_oc is created associated with the gateway gtw, with the parameter p, with the communications medium med and with the set of paths gtw_path_l. In other words, with this signal occurrence is associated the set of topological paths from the hosting computer fs_oc and passing through the hosting gateway gtw, and conveying the parameter p over the communications medium med. Advantageously, with the signal occurrence gtw_signal_oc is associated the same occurrence identifier as the one of the gateway gtw.

Having proceeded in this way for each signal occurrence signal_oc associated with a source software module fs_oc, a parameter p and a communications medium med, it is possible to group all the occurrences relating to a same parameter, a same functional system (the occurrences of which are gateways) and to a same communications medium for defining a signal. A communications port is assigned to this signal, which amounts to creating an output port in each of the computers hosting a gateway.

Finally, the configuration of the input interfaces of the computers of the avionic platform is performed as follows:

The set of signal occurrences generated by the set of source software modules and the set of gateways is used as described above. A signal occurrence signal_oc of this set is considered, associated with a source software module fs_oc or an application gateway gtw, a parameter p, a communications medium med and a set of paths signal_oc_path_l (source software module) or gtw_path_l (application gateway).

For each path path of signal_oc_path_l, the first computer is considered, placed on the path path after the one which hosts fs_oc. If this first computer hosts a gateway, the signal occurrence signal_oc is associated with this gateway and an input (logic or physical) port of the computer which hosts it, is assigned to it. If not, the signal occurrence signal_oc is associated with the addressed software module of the functional link occurrence associated with the path path (see relationship B in FIGS. 1 and 2). With this signal occurrence is also associated an input (logic or physical) port of the computer which hosts the addressed software module.

Similarly, for each path path of gtw_path_l, the first computer is considered as placed on the path path after the one which hosts gtw, and one proceeds as above.

The invention claimed is:

1. A method for configuring interfaces of computers belonging to an avionic platform of an aircraft, said platform implementing a plurality of avionic functions, which exchange functional messages, each avionic function being implemented by software modules, hereinafter referred to as functional system occurrences, hosted in computers, said computers communicating by means of signal occurrences transmitted over communications media which connect said computers together, the method comprising:
- creating, for each software module hosted by a computer of said computers that belong to the avionic platform, signal occurrences for transmitting all parameters of the functional messages emitted by the avionic function implemented by the respective software module, over all communications media, the avionic platform corresponding to all on-board computing and communication devices that execute the avionic functions of the aircraft;
- grouping said signal occurrences per functional system, parameter, and communication media to create signal occurrence classes;
- configuring the interfaces of the computers belonging to the avionic platform, based on the obtained signal occurrence classes;
- assigning a communications port of a computer of said computers to each signal occurrence class;
- for each software module fs_oc hosted by a computer, determining a list f_l of avionic functions, in the implementation of which the respective software module intervenes, and then determining a list p_l of the parameters comprised in functional messages emitted by the functions of f_l, and, for each parameter p of p_l, determining a list fl_l of links between avionic functions, hereinafter referred to as functional links, conveying at least one functional message containing said parameter p;
- inferring therefrom a list path_l of paths through the communications media for forwarding said functional messages; and
- determining a list med_l of the communications media followed through the paths of path_l.

2. The configuration method according to claim 1, each path of said list path_l of paths consists of a direct link between a first computer and a second computer, or else, of a first link between the first computer and a first node of a network, of a path through this network and of a second link between the second node of the network and the second computer.

3. The configuration method according to claim 2, wherein for a given software module fs_oc, creating a signal occurrence, for each parameter p of p_l, each communications medium med of med_l and a subset signal_oc_path_l of paths of path_l such that the first connection of these paths passes through a communications medium med of med_l.

4. The configuration method according to claim 3, wherein the avionic platform includes at least one computer connected to two communications media of distinct types, said computer hosting a software module suitable for operating as an application gateway between both communications media.

5. The configuration method according to claim 4, wherein for a given signal occurrence, signal_oc, associated with a software module fs_oc, a parameter p, and a subset signal_oc_path_l, determining a subset of the latter, signal_oc_gtw_l, consisting of paths passing through at least one computer hosting an application gateway, and then determining a set gtw_l of the application gateways, hosted by computers placed on the paths of signal_oc_gtw_l, next determining for each gateway gtw of gtw_l
- a list gtw_rx_med_l of communications media arriving at gtw via a path of signal_oc_gtw_path_l,
- a list gtw_tx_med_l of communications media leaving gtw via a path of signal_oc_gtw_path_l, and
- a subset gtw_path_l of signal_oc_gtw_path_l formed by the paths passing through the computer hosting the gateway.

6. The configuration method according to claim 5, wherein for each gateway gtw of gtw_l and each communications medium of gtw_tx_med_l, creating a signal occurrence gtw_signal_oc associated with the gateway gtw, with the parameter p, with the communications medium med and with the subset of paths gtw_path_l.

7. The configuration method according to claim 6, wherein for each signal occurrence signal_oc, associated with a source software module fs_oc or an application gateway gtw, a parameter p, a communications medium med and a set of paths signal_oc_path_l or gtw_path_l, for each path path of signal_oc_path_l or gtw_path_l, determining the first computer placed on the path path after the computer which hosts the software module fs_oc or the application gateway gtw, and if the first computer hosts a gateway the signal occurrence signal_oc is associated with the latter, and if not, the signal occurrence signal_oc is associated with the addressed software module of the functional link occurrence associated with the path path.

8. The configuration method according to claim 7, further comprising assigning a communications port of the computer hosting the application gateway and the addressed software module respectively to the signal occurrence signal_oc.

9. The configuration method according to claim 1, wherein the avionic platform is of the Integrated Modular Avionics (IMA) type.

10. The configuration method according to claim 1, wherein a same communications port is assigned to different signal occurrence classes.

11. The configuration method according to claim 1, wherein a different communications port is assigned to each signal occurrence class.

* * * * *